United States Patent [19]
Van Es et al.

[11] Patent Number: 5,588,607
[45] Date of Patent: Dec. 31, 1996

[54] APPARATUS WITH A DRIVE ARRANGEMENT OF INFORMATION CARRIERS IN THE FORM OF TAPES

[75] Inventors: Arthur R. Van Es; Gerard Van Engelen; Theodorus H. M. De Nier; Johannes F. Hoefnagels, all of Eindhoven, Netherlands

[73] Assignee: U.S. Philips Corporation, New York, N.Y.

[21] Appl. No.: 394,978

[22] Filed: Feb. 27, 1995

[30] Foreign Application Priority Data

Mar. 2, 1994 [EP] European Pat. Off. ............... 94200528

[51] Int. Cl.$^6$ ................................................. G11B 15/44
[52] U.S. Cl. ..................................................... 242/356.3
[58] Field of Search ................................ 242/356, 356.3, 242/356.4; 360/96.3

[56] References Cited

U.S. PATENT DOCUMENTS

| | | | |
|---|---|---|---|
| 4,046,334 | 9/1977 | Kato et al. ............................... | 242/356 |
| 4,301,483 | 11/1981 | Santoro .................................... | 360/96.3 |
| 4,599,662 | 7/1986 | Iwasaki ................................. | 242/356.4 |
| 4,956,731 | 9/1990 | Yoshimura ............................. | 360/96.3 |
| 5,260,844 | 11/1993 | Koga et al. ............................ | 360/96.3 |
| 5,438,466 | 8/1995 | Koguchi et al. ......................... | 242/356 |
| 5,472,151 | 12/1995 | Choi et al. ............................. | 242/356.4 |

FOREIGN PATENT DOCUMENTS

| | | | |
|---|---|---|---|
| 62-295247 | 12/1987 | Japan ..................................... | 360/96.3 |
| 2224876 | 5/1990 | United Kingdom .................. | 360/96.3 |

*Primary Examiner*—John P. Darling
*Attorney, Agent, or Firm*—Brian J. Wieghaus

[57] ABSTRACT

A magnetic-tape player has a drive arrangement for winding a tape between two reel hubs. The drive arrangement can drive both reel hubs with different transmission ratios by a motor and four transmission devices. The drive arrangement is controlled entirely by a cam disc capable of counterclockwise rotation.

20 Claims, 11 Drawing Sheets

APPARATUS WITH A DRIVE ARRANGEMENT OF INFORMATION CARRIERS IN THE FORM OF TAPES

BACKGROUND OF THE INVENTION

The invention relates to an apparatus comprising a drive arrangement for winding an information carrier in the form of a tape between a first reel hub and a second reel hub and vice versa, which apparatus comprises a motor having a motor shaft which can be driven in a positive direction of rotation and an opposite negative direction of rotation, at least one motor wheel coupled to the motor shaft for rotation in each of the directions of rotation, a first drive spindle for driving the first reel hub and provided with at least one spindle wheel, a second drive spindle for driving the second reel hub and provided with at least one spindle wheel, a first, a second, a third and a fourth transmission device, respectively, comprising a first, a second, a third and a fourth set of drive wheels, at least some of said drive wheels being movable relative to one another, which sets each include at least one of the motor wheels and one of the spindle wheels, which transmission devices are switchable between inactive and active states and which respectively serve for the motor shaft to drive the first drive spindle with a first transmission ratio, the second drive spindle with a first transmission ratio, the first drive spindle with a second transmission ratio, the second drive spindle with a second transmission ratio, switching mechanisms for switching the first, the second, the third and the fourth transmission device between active and inactive states, a rotatable cam disc having guide surfaces which cooperate with at least one switching mechanism, a cam disc drive wheel for driving the cam disc, in which apparatus the cam disc can be set to a plurality of stop positions which correspond to one of the states of one of the transmission devices, while at the same time the other transmission devices are in their inactive states.

Such an apparatus is known from EP 0,488,714 A1 (herewith incorporated by reference). The known apparatus serves for reproducing and, if desired, also recording signals from/on the magnetic tape of a Compact Cassette. The cassettes are suitable for recording and reproducing information both during transport of the tape in a first and in an opposite second tape Wansport direction. The known apparatus has a reproduction mode for each of said transport directions, for which it is not necessary to remove the cassette from the apparatus. The apparatus also has a fast wind mode for each of the transport directions for rapidly proceeding to a given piece of information on the tape. All the tape transport modes can be selected by the electrical control of the motor for rotation in one of the two directions of rotation in combination with the electrical energisation of an electromagnet. How and in what manner these modes are selected in the known apparatus will be described in detail hereinafter.

The cam disc of the known apparatus serves as a driving element for certain switching movements. For this purpose the cam disc has a plurality of curved guide surfaces which locally make an angle with the tangent to the cam disc. Owing to this angle a non-rotating element which is in contact with a guide surface will be moved upon a given rotation of the cam disc. The known apparatus further comprises an electromagnet which cooperates with the cam disc via a lever.

By energising the electromagnet in the case of a positive direction of rotation of the motor shaft the cam disc is rotated from a first stop position, in which the first and the second transmission device are in an inactive state, to a second stop position. Thus, the first transmission device is switched to the active state by cooperation of a first switching mechanism with a first guide surface. As a result of the actuation of the electromagnet the cam disc is slightly rotated, after which the cam disc drive wheel meshes with a toothed portion on the cam disc. When the motor shaft is driven in the positive direction of rotation this cam disc drive wheel rotates the cam disc in the same direction until a recess in the toothed portion of the cam disc is situated at the location of the cam disc drive wheel, where the second stop position of the cam disc is reached. As a result of the cooperation of the first switching mechanism with the first guide surface of the cam disc the motor shaft is brought into driving relationship with the first drive spindle via the first set of drive wheels. In the case of a positive direction of rotation of the motor shaft the motor shaft will drive the first drive spindle with the first transmission ratio.

By energising the electromagnet two times with a break while the motor shaft rotates in a positive direction the cam disc will be rotated from the first stop position to the second stop position, the second transmission device being set to the active state by cooperation of the first switching mechanism with a second guide surface. To start this rotation the electromagnet is energised a first time. The second energisation sets the first switching mechanism, via a lever which is driven by a third guide surface of the cam profile, to a position in which the first switching mechanism cooperates with the second surface of the cam profile. Owing to the cooperation of the first switching mechanism with the second guide surface of the cam profile the motor shaft is brought into driving relationship with the second drive spindle via the second set of wheels. As a result of this, the motor shaft drives the second drive spindle with the first transmission ratio in the case of a positive direction of rotation of the motor shaft.

By energising the electromagnet in the second stop position the cam disc is rotated into the first stop position in a manner similar to that described above. As a result of this rotation the first switching mechanism is returned to its original state by cooperation with the cam disc. Thus, the first transmission device or the second transmission device is set from the active to an inactive state.

The third transmission device can be set to the active state by means of a so-called fiction clutch by driving the motor shaft in the negative direction of rotation. The fiction clutch comprises a switching wheel supported on a movable element. This element is positioned by a friction force produced by a friction which has been provided deliberately between a rotating drive wheel and its environment. The direction of the force depends on the direction of rotation of the drive wheel, so that the switching wheel is brought into or out of mesh with a subsequent drive wheel depending on this direction of rotation. The fiction clutch forms part of the third transmission device, which is activated by driving the motor shaft in the negative direction of rotation, so that the motor shaft is brought into driving relationship with the first drive spindle via the third set of wheels. In the case of a negative direction of rotation of the motor shaft the motor shaft drives the first drive spindle with a second transmission ratio.

The fourth transmission device can be set to the active state by driving the motor shaft in the positive direction of rotation when the cam disc is in the first stop position. In the other angular positions of the cam disc this is impossible owing to the cooperation of a second switching mechanism with a second set of guide surfaces on the cam disc. This second switching mechanism comprises a slide member and a fiction clutch. When the cam disc is in said first stop position the second set of guide surfaces has positioned the slide member in such a manner that the fiction clutch is activated by a positive direction of rotation of the motor shaft. Thus, the motor shaft is brought into driving relationship with the second drive spindle via the third set of wheels, so that the motor shaft drives the second drive spindle with the second transmission ratio.

To locate a piece of information on the tape the user wishes to use the first transmission ratio for the reproduction of the information on the tape and, subsequently, the second transmission ratio to proceed with a higher speed to another location at the tape. For successively driving the first drive spindle with these two transmission ratios it is each time necessary to change the direction of rotation of the motor shaft in the known apparatus, which requires time. Moreover, in operation there is a continual loss of energy in the said apparatus owing to the deliberately applied friction in the friction clutch. In addition, energy is dissipated in that several gear wheels rotate without these wheels contributing to the transport of the tape, which may also produce undesirable noise. When an independent current source such as dry batteries or a storage battery is used this results in an unnecessary reduction of the playing time of the known apparatus.

SUMMARY OF THE INVENTION

It is an object of the invention to improve an apparatus of the type defined in the opening paragraph in such a manner that energy losses are reduced and faster switching is possible between the inactive and active states of the various transmission devices and also to provide an apparatus in which the number of parts used can be reduced by applying appropriate steps to be described hereinafter.

To this end the apparatus in accordance with the invention is characterised in that said states of the first, the second, the third and the fourth transmission device are determined exclusively by the cam disc, and the cam disc is rotatable both in a clockwise direction of rotation and in an opposite counterclockwise direction of rotation and cooperates with the switching mechanisms in each of the directions of rotation.

Since the states of the transmission devices are exclusively determined by the cam disc and, consequently, all the drive wheels of the transmission devices are moved by the cam disc no friction clutches are needed for driving the tape. Since friction clutches always dissipate more energy than normally journalled gear wheels and require additional pans this step reduces the energy consumption as compared with the prior art. An advantage of the invention is that the cam disc can cooperate with the switching mechanisms both during clockwise and counterclockwise rotation. This enables the cam disc to be brought directly into driving relationship with the motor shaft in any direction of rotation of this shaft, so that rapid switching between the states of the transmission devices is possible. If the cam disc can cooperate with the switching mechanisms in only one direction of rotation as in the above-mentioned known apparatus extra time will be required to reverse the direction of rotation of the motor shaft, if necessary, before the cam disc may be driven. This will lead to an unnecessary waiting time after a user command. Other solutions are conceivable where the cam-disc drive wheel rotates in the same direction in all the active states of all the transmission devices. However, this requires additional parts and in order to reach a given mode it is often necessary to pass unnecessarily through other modes.

A further advantage can be obtained by using a first variant of the invention, which is characterised in that a number of states of the first, the second, the third and the fourth transmission device are determined by the current stop position of the cam disc and by the direction of rotation in which the cam disc has been rotated to reach the current stop position from a previous stop position preceding the current stop position. As the cam disc has two directions of rotation a number of stop positions may correspond to two different states of the transmission devices. As a result, less stop positions are necessary so that a larger segment of the cam disc is available to move the drive wheels from one state to the other via the first or the second mechanism. Thus, an adequate excursion can be obtained with a limited size of the cam disc.

A further embodiment of the invention is characterised in that the apparatus comprises a first switching mechanism for switching the first transmission device and the second transmission device between active and inactive states, and the first switching mechanism comprises a first cam follower which cooperates with a plurality of guide surfaces of the cam disc, the apparatus comprises a second switching mechanism for switching the third transmission device and the fourth transmission device between active and inactive states, and the second switching mechanism comprises a second earn follower which cooperates with a plurality of guide surfaces of the earn disc, when the cam disc is rotated from a given angular position while the motor shaft rotates in the positive direction of rotation the first cam follower engages a first guide surface and sets the first switching mechanism to a position in which the first transmission device is in the active state and when the cam disc is rotated further in the same direction the first cam follower returns to its initial position, when the cam disc is rotated from a given angular position in which it has been rotated through 180 degrees relative to said given angular position while the motor shaft rotates in the negative direction of rotation the first cam follower engages a second guide surface and sets the first switching mechanism to a position in which the second transmission device is in the active state and when the cam disc is rotated further in the same direction the first cam follower returns to its initial position, when the cam disc is rotated from a given angular position in which it has been rotated through 180 degrees relative to said given angular position while the motor shaft rotates in the positive direction of rotation the second cam follower engages a third guide surface and sets the second switching mechanism to a position in which the third transmission device is in the active state and when the cam disc is rotated further in the same direction the second cam follower returns to its initial position, when the cam disc is rotated from said given angular position while the motor shaft rotates in the negative direction of rotation the second cam follower engages a fourth guide surface and sets the second switching mechanism to a position in which the fourth transmission device is in the active state and when the cam disc is rotated further in the same direction the second cam follower returns to its initial position.

By means of these steps it is achieved that in both directions tape transport can be effected successively with a first and a second transmission ratio without the direction of rotation of the driving shaft having to be changed, thus enabling a specific piece of information on the tape to be located rapidly and with a minimal loss of energy.

Another improved version of the last-mentioned embodiment is characterised in that the first switching mechanism and the second switching mechanism can each be set to two extreme positions and one centre position, i.e. one extreme position in which the first transmission device or the third transmission device, respectively, is in the active state, one extreme position in which the second transmission device or the fourth transmission device, respectively, is in the active state, one centre position in which the first transmission device and the second transmission device, or the third transmission device and the fourth transmission device, respectively, are in an inactive state.

The last-mentioned embodiment has the advantage that it is always possible to switch between an active and an inactive state without the need to pass through another active state. This precludes unnecessary driving of a reel hub, as result of which the position of the information carrier tape would be changed or the information carrier tape would be unwound. The last-mentioned aspect is important because during unwinding loops may be formed in the information carder tape, which is liable to give rise to damage to the information carrier.

A further embodiment of the apparatus is characterised in that the first cam follower and the second cam follower perform substantially the same stroke in order to switch between an active and an inactive state of a transmission device, and the first switching mechanism and the second switching mechanism cooperate with the same guide surfaces of the cam disc. In a construction with a separate set of guide surfaces for each switching mechanism these sets of guide surfaces should be geometrically separated from one another. This is achieved by a concentric arrangement of these sets (as described in EP 0,488,714 A1), so that a larger diameter of the cam disc is necessary to realise a similar excursion of the cam followers, or by the use of guide surfaces for the first switching mechanism on one side in combination with guide surfaces for the second switching mechanism on the other side of the cam disc, which results in an increased height of the construction. These drawbacks are avoided with the above embodiment of the invention.

Another embodiment of the invention is characterised in that two drive wheels belonging to one of the transmission devices comprise pulleys which are rotatable about axes of rotation and which are mutually coupled in a driving relationship via an elastic belt, and the axes of rotation of the pulleys are disposed closer to one another in the inactive state than in the active state of the transmission device to which the drive wheels belong.

Since the pulleys are closer to one another in the inactive state than in the active state the tensile forces in the elastic belt are smaller in the inactive state than in the active state of the relevant transmission device. This limits the energy loss in the belt and in the bearing means of the pulleys interconnected by the belt in operational situations in which the belt does not contribute to driving of the drive spindles.

The number of parts can be reduced by constructing the apparatus in accordance with a further embodiment of the invention, which is characterised in that the drive spindles and the cam disc drive wheel can be driven by the same motor. This embodiment has the advantage that no separate drive motor is needed to drive the cam disc drive wheel.

The number of parts can be reduced even further by constructing the apparatus in accordance with a following embodiment, which is characterised in that a drive wheel of the first set of drive wheels or the second set of drive wheels can be driven by the motor in all the stop positions of the cam disc, the cam disc drive wheel is supported on the same spindle as said drive wheel, and the cam disc drive wheel is non-rotatably coupled to said drive wheel.

By integrating the cam disc drive wheel with a drive wheel of one of said sets it is possible to save one separate part.

A further embodiment of the invention is characterised in that the cam disc has a plurality of circumferential recesses which are each disposed opposite the cam disc drive wheel in one of the stop positions and the cam disc drive wheel is freely rotatable in one of said recesses in said stop positions, the apparatus comprises positioning mechanism for temporarily realising a driving cooperation between the cam disc and the cam disc drive wheel when the cam disc is in a stop position in which a circumferential recess is disposed opposite the cam disc drive wheel, and the positioning mechanism comprises at least one slide which is movable between retracted and slid-out positions and which comprises at least one driving portion at a free end, a sliding mechanism adapted to cooperate with the slides, and a disengageable latch adapted to cooperate with the sliding mechanism, and by disengagement of the latch the sliding mechanism can move a slide to a slid-out position in which a driving portion is in contact with the cam disc drive wheel and the slide is non-rotatably coupled to the cam disc and the cam disc drive wheel is in a driving relationship with the cam disc.

Since depending on the direction of rotation of the drive wheel the cam disc should be rotatable in two directions from a stop position in which the cam disc drive wheel is disposed opposite a circumferential recess in the cam disc a solution as described in EP 0,488,714 A1 is no longer adequate. In the case of the solution proposed therein the cam disc is always rotated in the same direction after unlocking. In the above embodiment of the invention the circumferential recess in the cam disc is temporarily fried by the drive portion of a slide, so that the cam disc is driven temporarily as though there were no recess at the location of the drive wheel.

BRIEF DESCRIPTION OF THE DRAWINGS

An embodiment of the invention will now be described in more detail, by way of non-limitative example, with reference to the drawings, in which.

It is to be noted that the Figures are highly diagrammatical and are shown to an arbitrary scale, which is not always the same. The operation of the apparatus and the change-over between the various modes will now be described in more detail with reference to the drawings.

DESCRIPTION OF THE PREFERRED EMBODIMENTS

Figure 1:
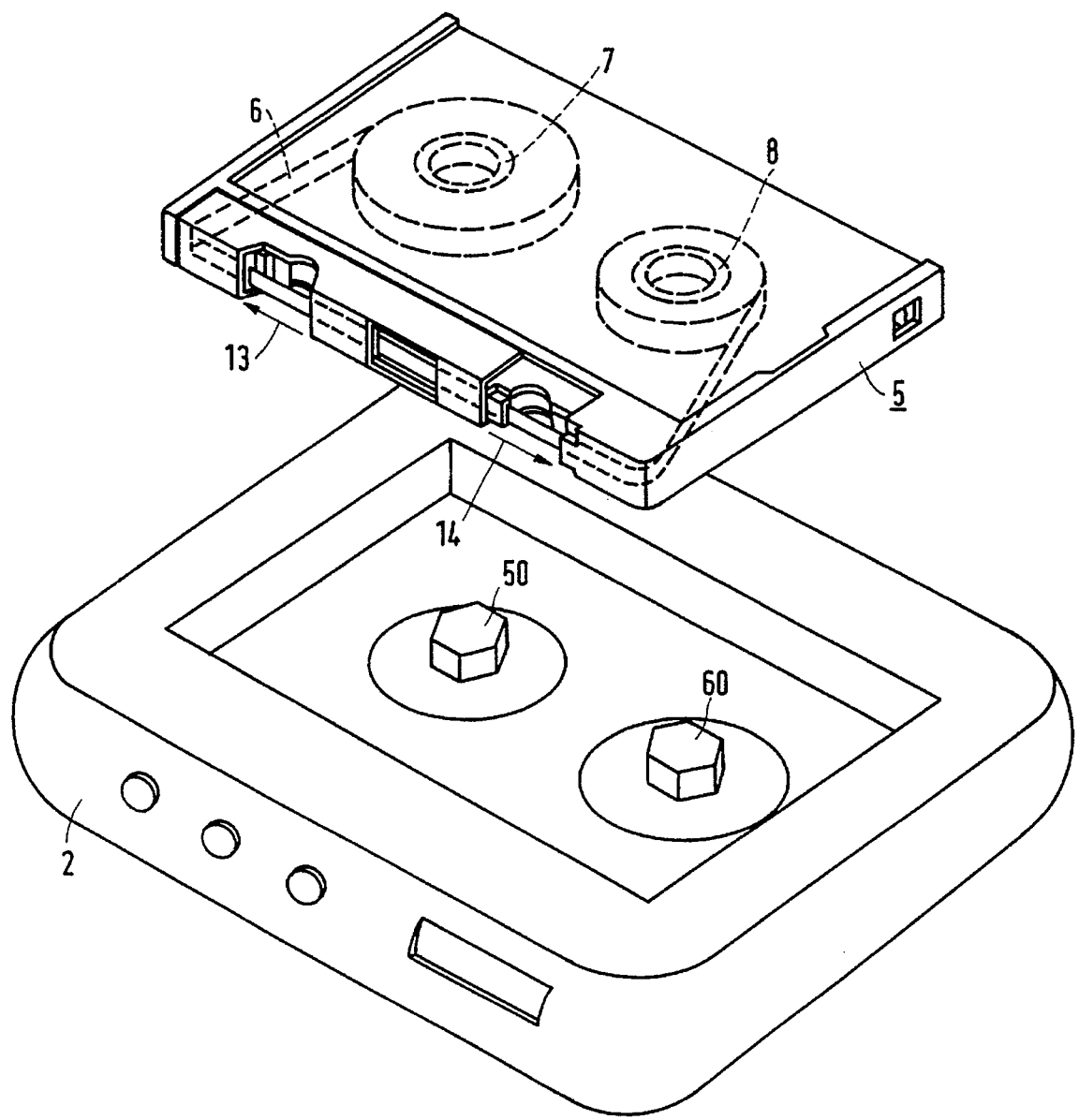
FIG. 1 is a perspective view of an apparatus and a cassette.

FIG. 1 shows a portable apparatus 2 and a cassette 5 having a first reel hub 7 and a second reel hub 8 on which a magnetic tape 6 has been wound. The apparatus 2 is intended for playing back and/or recording, for example, music on the tape 6 in the cassette 5 in accordance with an analog and/or a digital standard. The apparatus 2 is of such a construction that playing back and/or recording information on the tape 6 is possible only while the tape 6 is driven only via the reel hubs 7 and 8. This enables capstans with pressure rollers for a direct drive of the tape 6 to be dispensed with. The use of friction transmissions for driving the reel hubs 7 and 8 with a low speed precludes transmission irregularities as in the case of gear-wheel transmissions. This enables the transport of the tape 6 to be effected with such a uniformity that a proper reproduction of the information on the tape 6 is possible.

Figure 2:
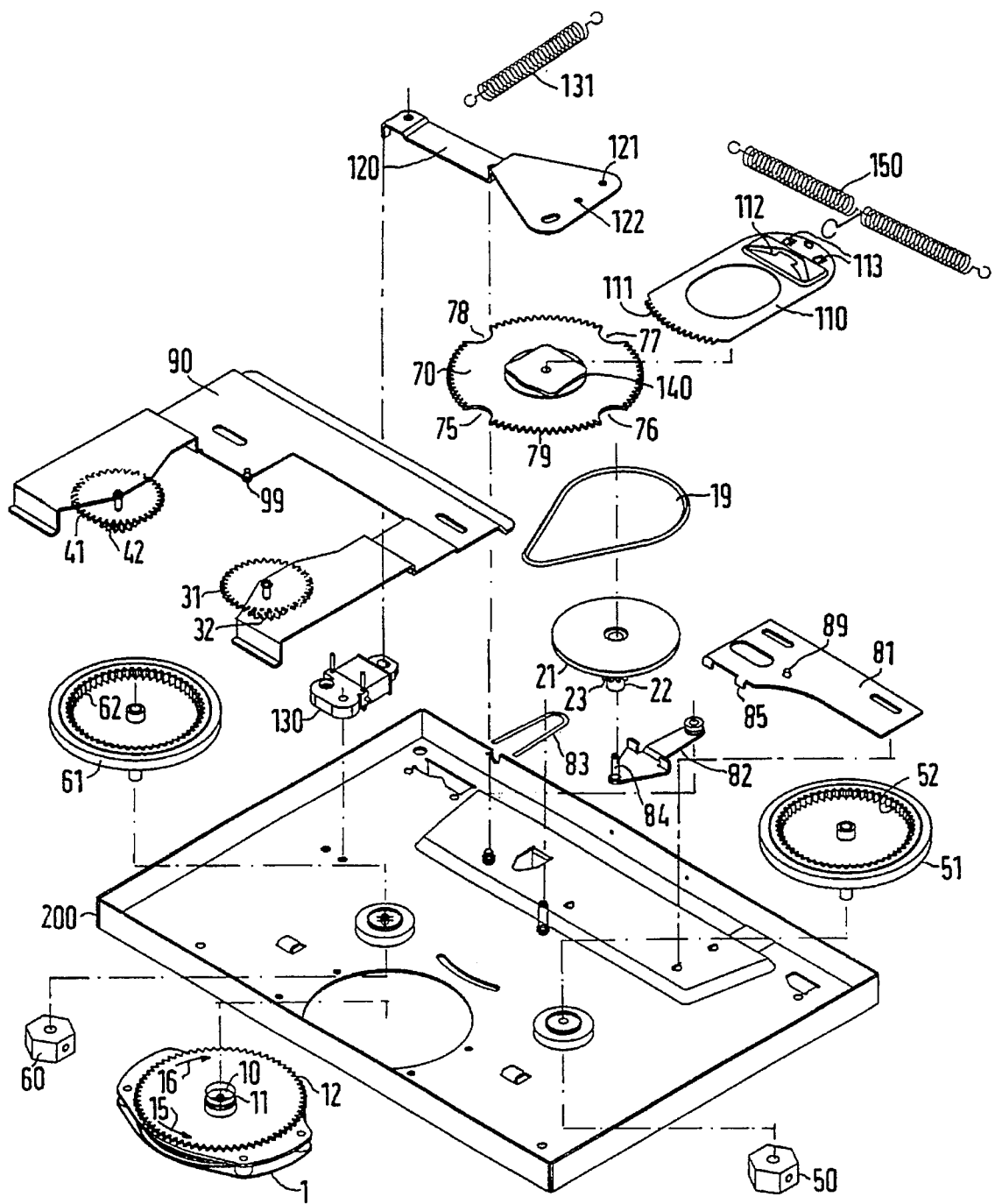
FIG. 2 is an exploded view of a drive arrangement of the apparatus.

FIG. 2 shows the parts of a drive arrangement of the apparatus 2 in accordance with the invention, for winding the tape 6 between the first reel hub 7 and the second reel hub 8 and vice versa, the positions of the parts relative to one another being illustrated by means of dash-dot lines. The drive arrangement comprises a motor 1 having a motor shaft 10 which can be driven in a positive direction of rotation 15 and an opposite negative direction of rotation 16. The motor shaft 10 carries at least one motor wheel, in the present case a motor pulley 11, and a motor gear wheel 12 coupled for rotation to the motor shaft 10. A chassis 200 supports a first drive spindle 50, for driving the first reel hub 7, provided with a part comprising an outer friction spindle wheel 51 and an inner toothed spindle wheel 52, and a second drive spindle 60, for driving the second reel hub 8, provided with a part comprising an outer friction spindle wheel 61 and an inner toothed spindle wheel 62. Also shown is a first slide member 81, which is slidably supported on the chassis 200 and comprises a first cam follower 89 and two lugs 85, which are adapted to cooperate with a spring 83, which can cooperate with a pivotal member 82, which is pivotably supported on the chassis 200. The pivotal member 82 has a spindle 84 which supports a part comprising a pulley 21, which can be driven by the motor pulley 11 via a belt 19, a cam disc drive wheel 23, and a friction wheel 22 adapted to cooperate with the friction spindle wheels 51 and 61. A second slide member 90, which is also slidably supported on the chassis, comprises a second cam follower 99 and carries two parts which each comprise two interconnected gear wheels 31, 32 and 41, 42, respectively, of which the first gear wheels 31 and 41 are adapted to cooperate with the motor gear wheel 12 and of which the second gear wheels 32 and 42 are adapted to cooperate with the toothed spindle wheels 52 and 62, respectively. FIG. 2 further shows a rotatable cam disc 70 having recesses 75, 76, 77 and 78. The cam disc 70 has teeth 79 adapted to cooperate with the cam disc drive wheel 23 and a quadrangular cam 140. FIG. 2 further shows the parts of a positioning mechanism 110, 120, 130, 131, which includes a slide 110 having a driving portion 111, a slot 112 and two teeth 113, a centring spring 150, which cooperates with the slide 110, a lever 120, which is pivotably supported on the chassis 200 and which has a first lever cam follower 121 and a second lever cam follower 122, which first lever cam follower 121 is adapted to cooperate with the slot 112 and which second lever cam follower 122 is adapted to cooperate with the quadrangular cam 140, a disengageable latch, in the present case an electromagnet 130, and a helical spring 131 for actuating the lever 120.

Figure 3:
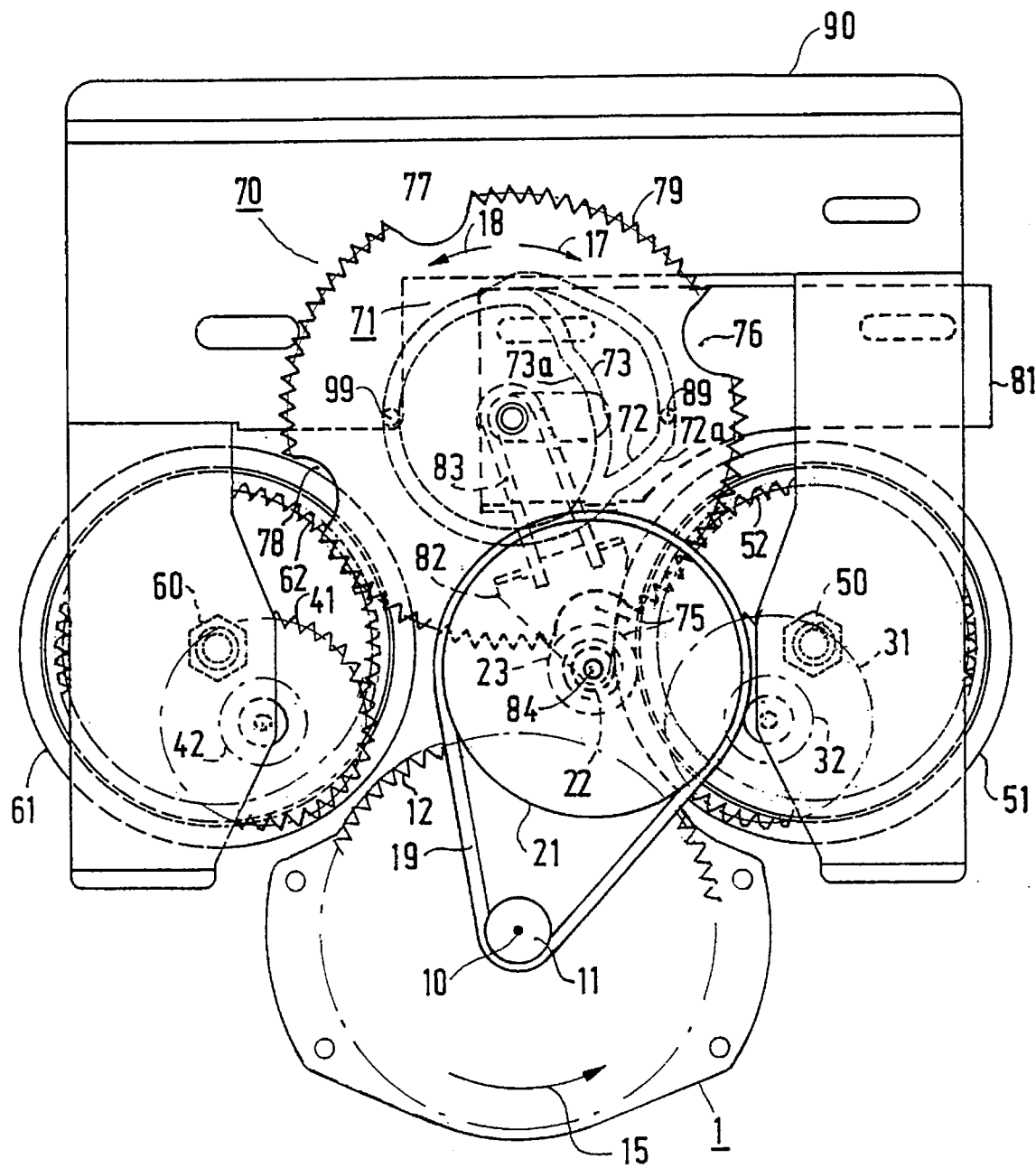
FIG. 3 is an underneath view of the drive arrangement, in which a first set of drive wheels transmits the rotation of a motor shaft with a first transmission ratio to a first drive spindle.

FIG. 3 is an underneath view of the drive arrangement and shows a first transmission device 11, 19, 21, 22, 51, which comprises a first set of drive wheels 11, 21, 22, 51, including at least one of the motor wheels and one of the spindle wheels, in the present case the motor pulley 11, the friction spindle wheel 51, the pivotable pulley 21 and the friction wheel 22, in an active state. In this active state the motor shaft 10 can drive the first drive spindle 50 with a first transmission ratio for playing back or recording information on the tape 6 in the cassette 5 in a first transport direction 13 of the tape 6. The first transmission device 11, 19, 21, 22, 51 can be switched between inactive and active states by means of a first switching mechanism 81, 82, 83, which in the present case comprises the first slide member 81, the spring 83 and the pivotal member 82. The cam disc 70 has guide surfaces 71. The cam disc 70 also has a plurality of circumferential recesses 75; 76; 77; 78 which in a stop position face the cam disc drive wheel 23, so that in these stop positions the cam disc drive wheel 23 can be rotated without the cam disc 70 being driven. In this position of the cam disc 70 the first transmission device 11, 19, 21, 22, 51 is in the active state because the first cam follower 89 has been so positioned by the guide surfaces 71 that the first slide member 81 presses the friction wheel 22 against the friction spindle wheel 51 via the spring 83 and the pivotal member 82. If in this situation the motor shaft 10 is driven in a positive direction of rotation 15 by energisation of the motor 1 the motor pulley 11, which is connected to the motor shaft 10, will drive the pivotable pulley 21 via the belt 19. The friction wheel 22, which is fixedly connected to the pivotable pulley 21, then drives the friction spindle wheel 51 with a friction transmission, which friction spindle wheel is coupled for rotation to the first drive spindle 50. As a result of this, the tape 6 is then driven via the first reel hub 7 when a cassette 5 is present in the apparatus 2.

Figure 4:
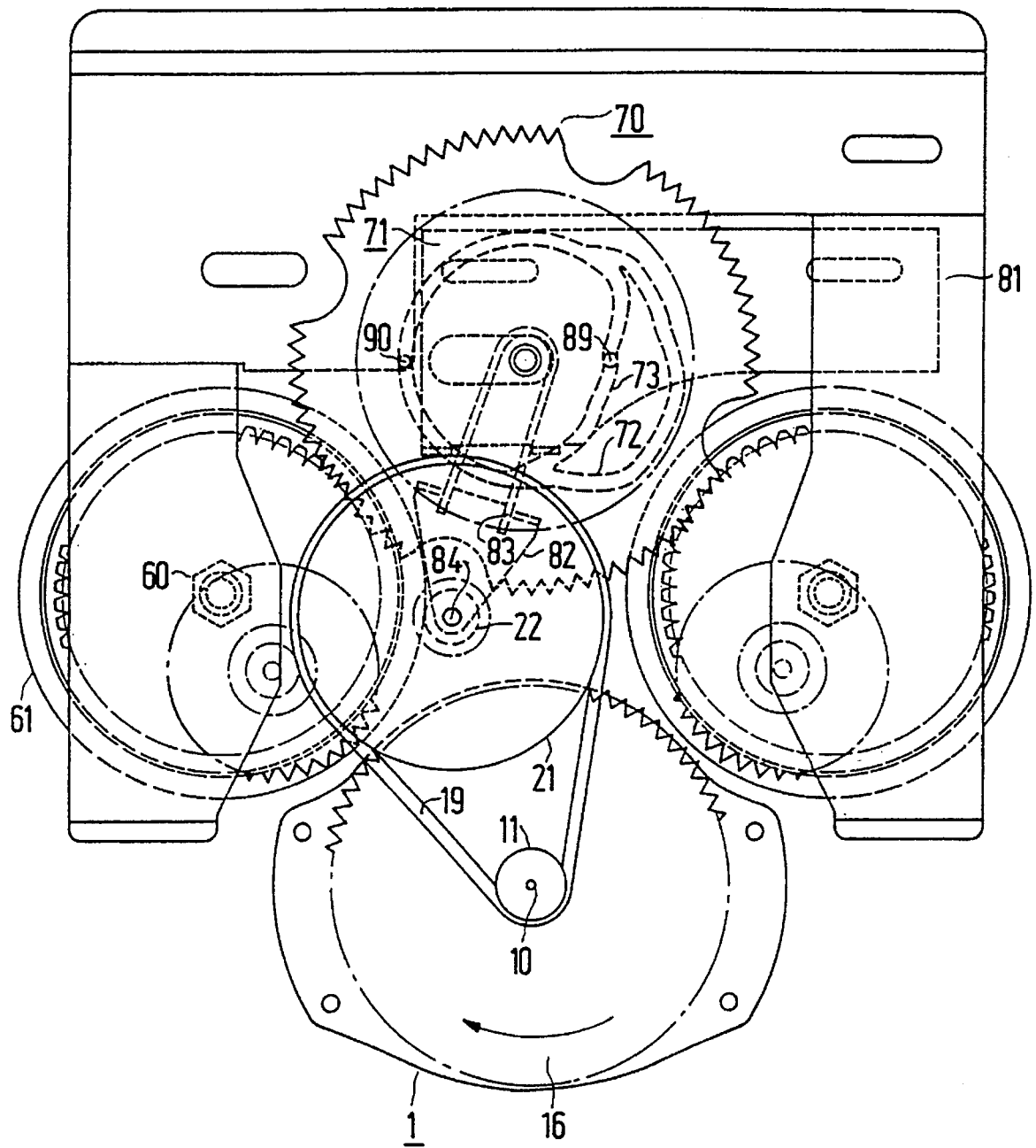
FIG. 4 is a view similar to that in FIG. 3 and showing a second set of drive wheels transmitting the rotation of the motor shaft with a first transmission ratio to a second drive spindle.

FIG. 4 is an underneath view of the drive arrangement and shows a second transmission device 11, 19, 21, 22, 61, which comprises a first set of drive wheels 11, 21, 22, 61, including at least one of the motor wheels and one of the spindle wheels, in the present case the motor pulley 11, the friction spindle wheel 61, the pivotable pulley 21 and the friction wheel 22, in an active state. In this active state the motor shaft 10 can drive the second drive spindle 60 with a first transmission ratio for playing back or recording information on the tape 6 in the cassette 5 in a second transport direction 14 of the tape 6. The second transmission device 11, 19, 21, 22, 61 can also be switched between inactive and active states by means of the first switching mechanism 81, 82, 83. In this position of the cam disc 70 the second transmission device 11, 19, 21, 22, 61 is in the active state because the first cam follower 89 has been so positioned by the guide surfaces 71 that the first slide member 81 presses the friction wheel 22 against the friction spindle wheel 51 via the spring 83 and the pivotal member 82. If in this situation the motor shaft 10 is driven in a negative direction of rotation 16 by energisation of the motor 1 the motor pulley 11, which is connected to the motor shaft 10, will drive the pivotable pulley 21 via the belt 19. The friction wheel 22, which is fixedly connected to the pivotable pulley 21, then drives the friction spindle wheel 61 with a friction transmission, which friction spindle wheel is coupled for rotation to the second drive spindle 60. As a result of this, the tape 6 is then driven via the second reel hub 8 when a cassette 5 is present in the apparatus 2.

Figure 5:
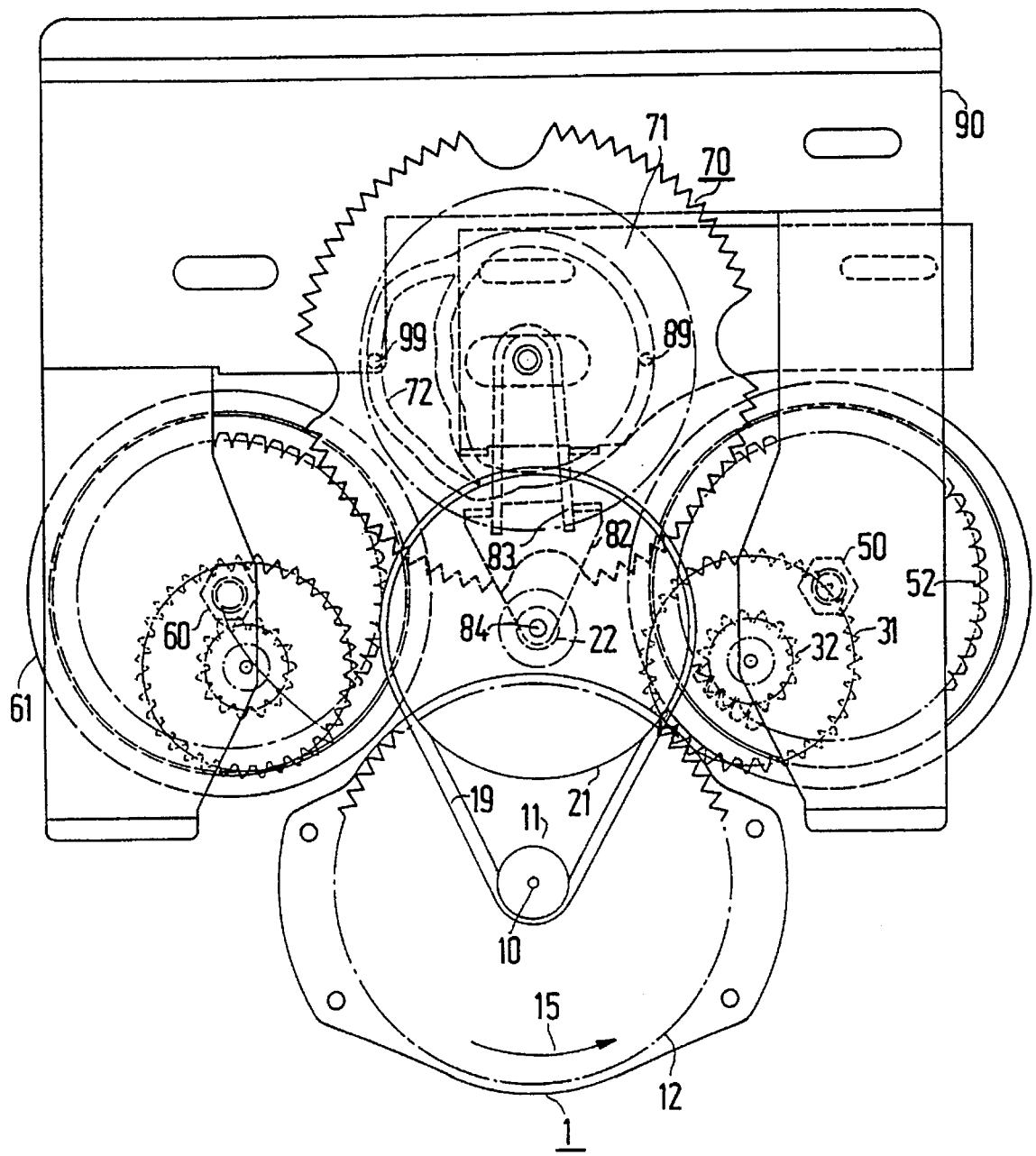
FIG. 5 is a view similar to that in FIG. 3 and showing a third set of drive wheels transmitting the rotation of the motor shaft with a second transmission ratio to the first drive spindle.

FIG. 5 is an underneath view of the drive arrangement and shows a third transmission device 12, 31, 32, 52, which comprises a third set of drive wheels 12, 31, 32, 52, including at least one of the motor wheels and one of the spindle wheels, in the present case the motor pulley 12, the toothed spindle wheel 52 and the gear wheels 31 and 32, in an active state. In this active state the first drive spindle 50 is driven with a second transmission ratio for rapidly winding the tape 6 onto the first reel hub 7 in the cassette 5. The third transmission device 12, 31, 32, 52 can also be switched between inactive and active states by means of a second switching mechanism 90, which in the present case consists of the second slide member 90. In this position of the cam disc 70 the third transmission device 12, 31, 32, 52 is in the active state because the second slide member 90 has been so positioned via the second cam follower 99 that the gear wheel 31 is in mesh with the motor gear wheel 12 and the gear wheel 32 is in mesh with the toothed spindle wheel 52. If in this situation the motor shaft 10 is driven in the positive direction of rotation 15 by energisation of the motor 1 the motor gear wheel 12, which is connected to the motor shaft 10, will drive the toothed spindle wheel 52 via the gear wheels 31 and 32. The toothed spindle wheel 52, which is coupled for rotation to the first drive spindle 50 will then drive the tape 6 via the first reel hub 7 when a cassette 5 is present in the apparatus 2.

Figure 6:
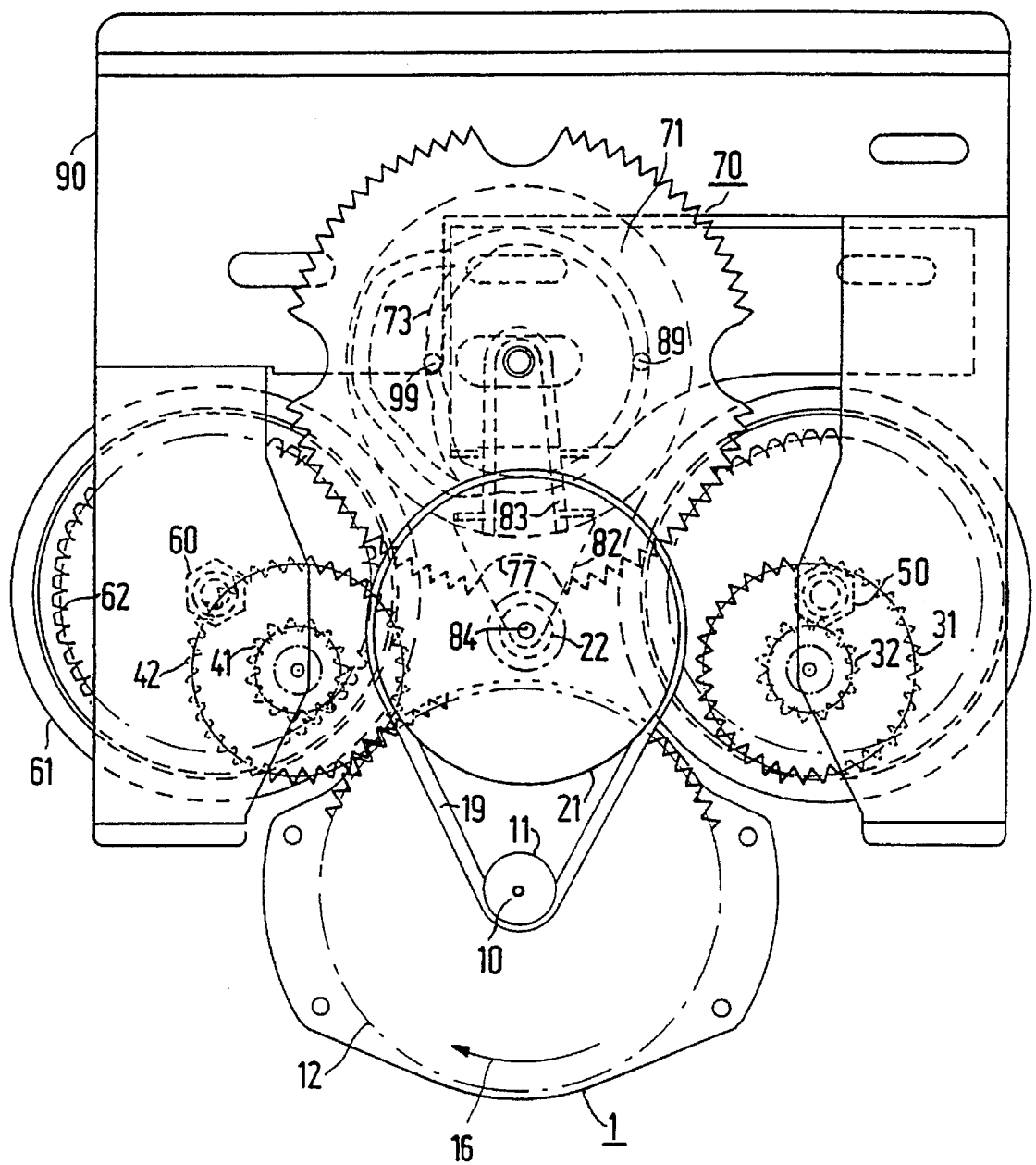
FIG. 6 is a view similar to that in FIG. 3 and showing a fourth set of drive wheels transmitting the rotation of the motor shaft with a second transmission ratio to the second drive spindle.

FIG. 6 is an underneath view of the drive arrangement and shows a fourth transmission device 12, 41, 42, 62, which comprises a fourth set of drive wheels 12, 41, 42, 62, including at least one of the motor wheels and one of the spindle wheels, in the present case the motor pulley 12, the toothed spindle wheel 62 and the gear wheels 41 and 42, in an active state. In this active state the second drive spindle 60 is driven with a second transmission ratio for rapidly winding the tape 6 onto the first reel hub 8 in the cassette 5. The fourth transmission device 12, 41, 42, 62 can also be switched between inactive and active states by means of the second switching mechanism 90. In this position of the cam disc 70 the second transmission device 12, 21, 22, 61 is in the active state because the second slide member 90 has been so positioned via the second cam follower 99 that the gear wheel 41 is in mesh with the motor gear wheel 12 and the gear wheel 42 is in mesh with the toothed spindle wheel 62. If in this situation the motor shaft 10 is driven in a negative direction of rotation 16 by energisation of the motor 1 the motor gear wheel 12, which is connected to the motor shaft 10, will drive the toothed spindle wheel 62 via the gear wheels 41 and 42. The toothed spindle wheel 62, which is coupled for rotation to the second drive spindle 60, will then drive the tape 6 via the second reel hub 8 when a cassette 5 is present in the apparatus 2.

Figure 7:
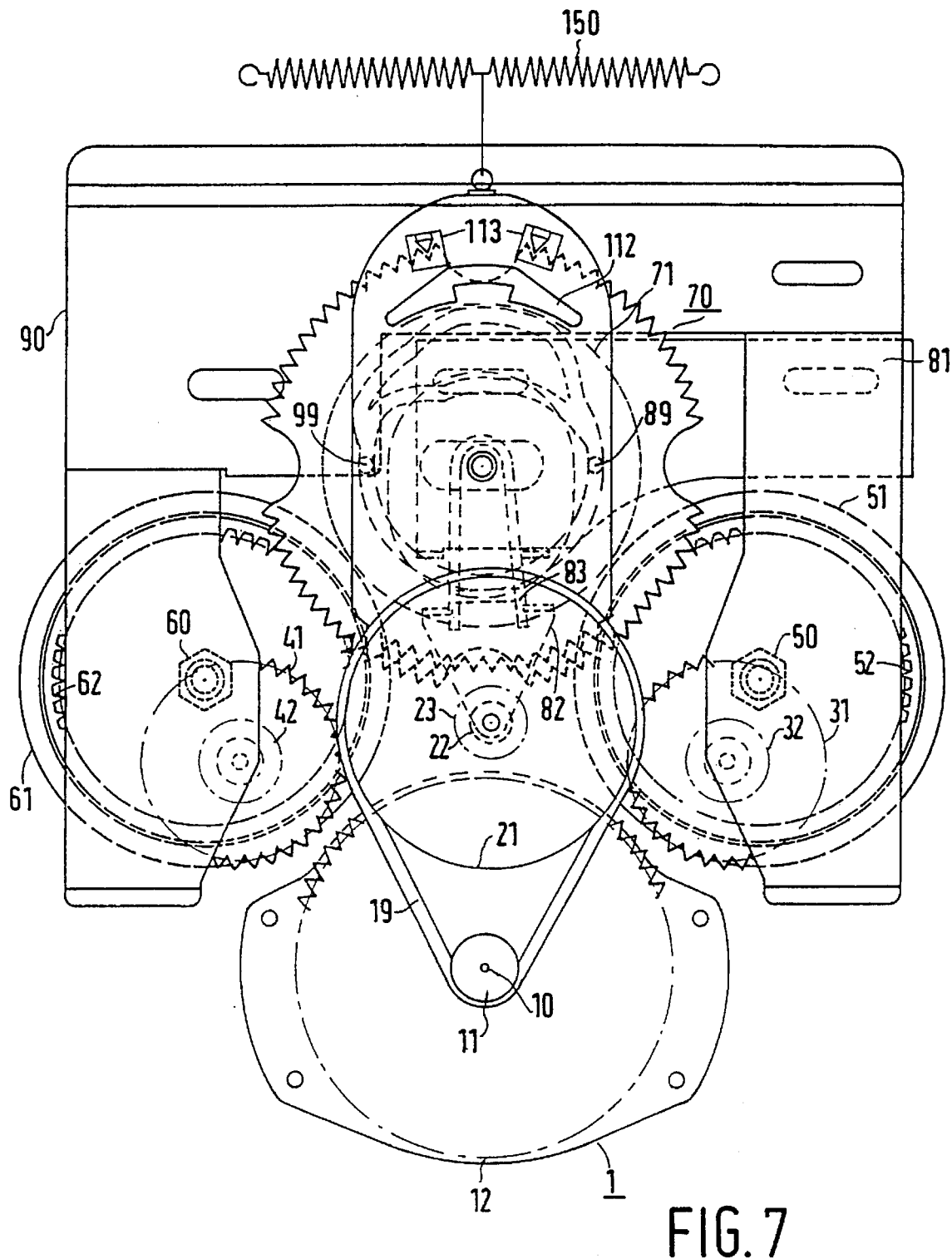
FIG. 7 is a view similar to that in FIG. 3 but in which the rotation of the motor shaft is not transmitted to any drive spindle.

FIG. 7 is an underneath view of the drive arrangement and shows the first, the second, the third, and the fourth transmission device 11, 19, 21, 22, 51, 11, 19, 21, 22, 61, 12, 31, 32, 52, 12, 41, 42, 62 in an inactive state, neither of the drive spindles 50, 60 being driven. The states of the transmission devices 11, 19, 21, 22, 51, 11, 19, 21, 22, 61, 12, 31, 32, 52, 12, 41, 42, 62 are determined by the position of the cam disc 70, the first cam follower 89 and the second cam follower 99 being held in a centre position by the guide surfaces 71. The first cam follower 89 is fixedly connected to the first slide member 81, which keeps the pivotal member 82 in a centre position via the spring 83. The pivotal member 82 carries a pivotal spindle 84 on which the pivotable pulley 21, the cam disc drive wheel 23 and the friction wheel 22, which are all three coupled to one another for rotation, are journalled. The two drive wheels 11 and 21, which belong to one of the transmission devices 11, 21, 22, 51, 11, 19, 21, 22, 61, 12, 31, 32, 52, 12, 41, 42, 62, comprise pulleys which are rotatable about axes of rotation and which are mutually coupled in a driving relationship via an elastic belt 19. In the present case the pivotable pulley 21 can be driven by the motor 1 via the belt 19 and the motor pulley 11, which is coupled for rotation to the motor shaft 10. In the inactive state of the first and the second transmission device 11, 19, 21, 22, 51, 11, 19, 21, 22, 61 the axes of rotation of the pulleys 11 and 21 are disposed closer to one another than in the active state of said transmission devices. Owing to the position of the motor 1 relative to the first switching mechanism 81, 82, 83 the axes of the pulleys 11 and 21 are automatically situated closer to one another in the inactive state than in the active state of the relevant transmission device. Since the pulleys 11 and 21 are disposed closer to one another in the inactive state than in the active state the tensile forces in the elastic belt 19 are smaller in the inactive state than in the active state of the relevant transmission device. In operation this limits the loss of energy in the belt 19 and in the bearing means of the pulleys 11 and 21, which are coupled by the belt 19, in the situations in which the belt 19 does not contribute to driving of the drive spindles 50 and 60. However, in this situation the tensile forces in the belt 19 remain large enough for the pivotable pulley 21, and hence the cam disc drive wheel 23, to be driven by the motor shaft 10. If the pivotable pulley 21 is thus driven the cam disc drive wheel 23 will not drive the cam disc 70 because the cam disc drive wheel 23 is situated exactly opposite a recess 76 in the teeth of the cam disc 79. The gear wheels 31, 32, 41 and 42 are not in mesh with any other drive wheel when the cam follower 99 is in the centre position. This precludes unnecessary dissipation. The drive wheels 21, 22 and 23 on the pivotable spindle cannot be disengaged because they are driven via the belt 19. The above method of coupling the cam disc drive wheel 23 to the pivotable pulley 21 yields the advantage that the motor is always in driving relationship with the cam disc drive wheel 23 without the provision of an additional transmission with the attendant loss of energy. Thus, by means of the belt transmission the number of rotating drive wheels which do not contribute to the tape transport is minimised, thereby reducing the dissipation in comparison with that of the known apparatus.

Figure 8:
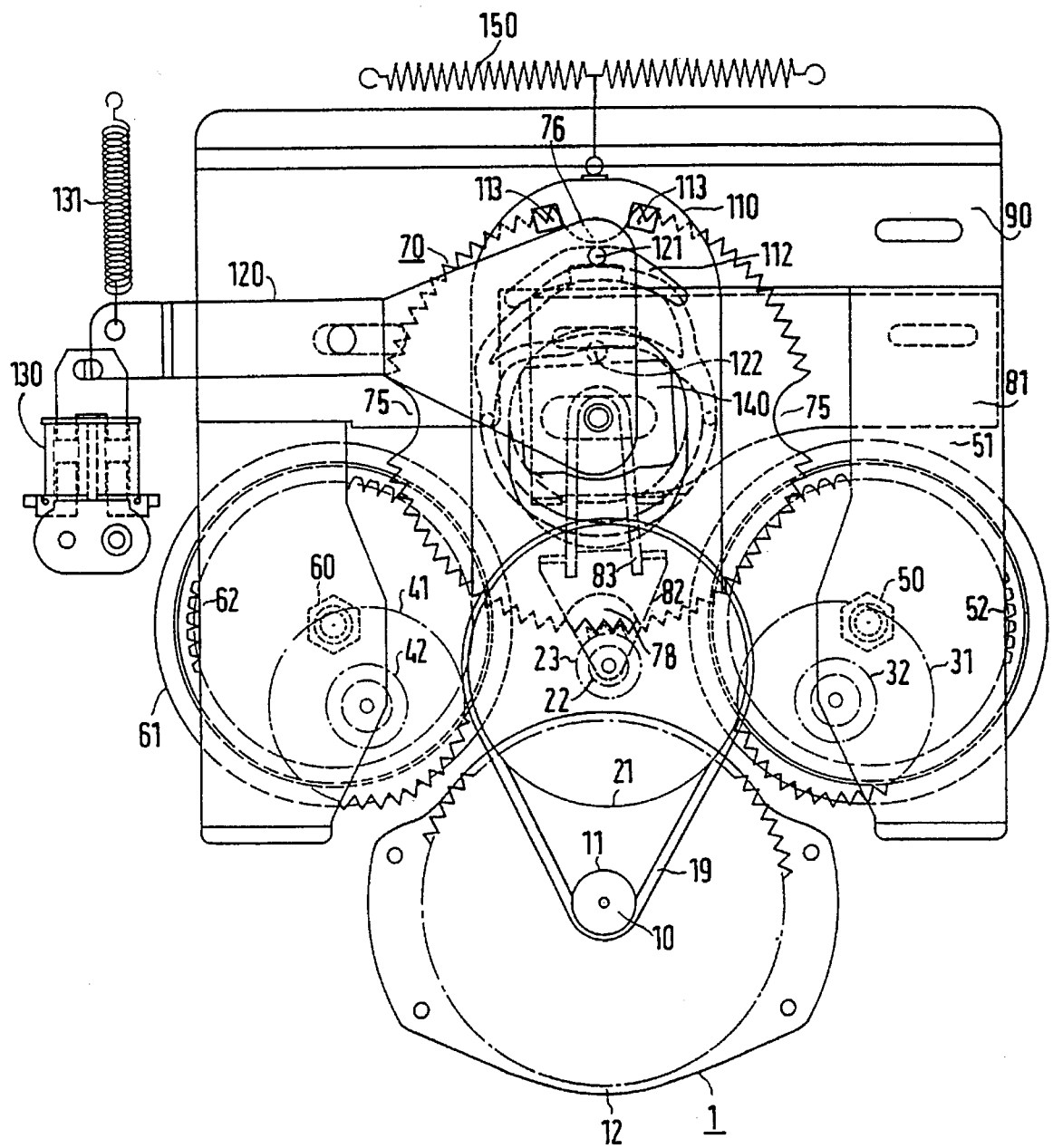
FIG. 8 is a view similar to that in FIG. 3 and in which a positioning mechanism has been activated for engagement of a cam disc drive wheel with a slide in a cam disc.

FIG. 8 is an underneath view of the drive arrangement, all the transmission devices 11, 19, 21, 22, 51, 11, 19, 21, 22, 61, 12, 31, 32, 52, 12, 41, 42, 62 being in an inactive state and the positioning mechanism being activated. The positioning mechanism serves for temporarily realising a driving cooperation between the cam disc 70 and the cam disc drive wheel 23 when the cam disc 70 is in a stop position in which a recess 75; 76; 77; 78 in the circumference of the cam disc 70 is disposed opposite the cam disc drive wheel 23. This positioning mechanism comprises at least one slide, in the present case the slide 110, which is movable between retracted and slid-out positions and which comprises at least one driving portion, in the present case the toothed portion 111, at a free end, a sliding mechanism, which in the present case comprises the lever 120 and the helical spring 131, and a disengageable latch, in the present case an electrically energisable electromagnet 130 adapted to cooperate with the sliding mechanism. In the present case the electromagnet 130 comprises a coil, a permanent magnet and two parts which are attached to one another under the influence of the permanent magnet. When the electromagnet is energised the coil can produce a magnetic field, which changes the force of attraction between the two parts. When the latch is disengaged by changing the energisation of the electromagnet 130, i.e. by applying the current, the sliding mechanism moves the slide 110 to a slid-out position. In this slid-out position the toothed portion 111 is in contact with the cam disc drive wheel 23 and the slide 110 is non-rotatably coupled to the cam disc 70, in the present embodiment in that the teeth 113 mesh with the teeth 79 of the cam disc 70. As a result, the cam disc drive wheel 23 is in a driving relationship with the cam disc 70. In the case of a positive direction of rotation 15 of the motor shaft 10 will then give rise to a situation as illustrated in FIG. 9.

Figure 9:
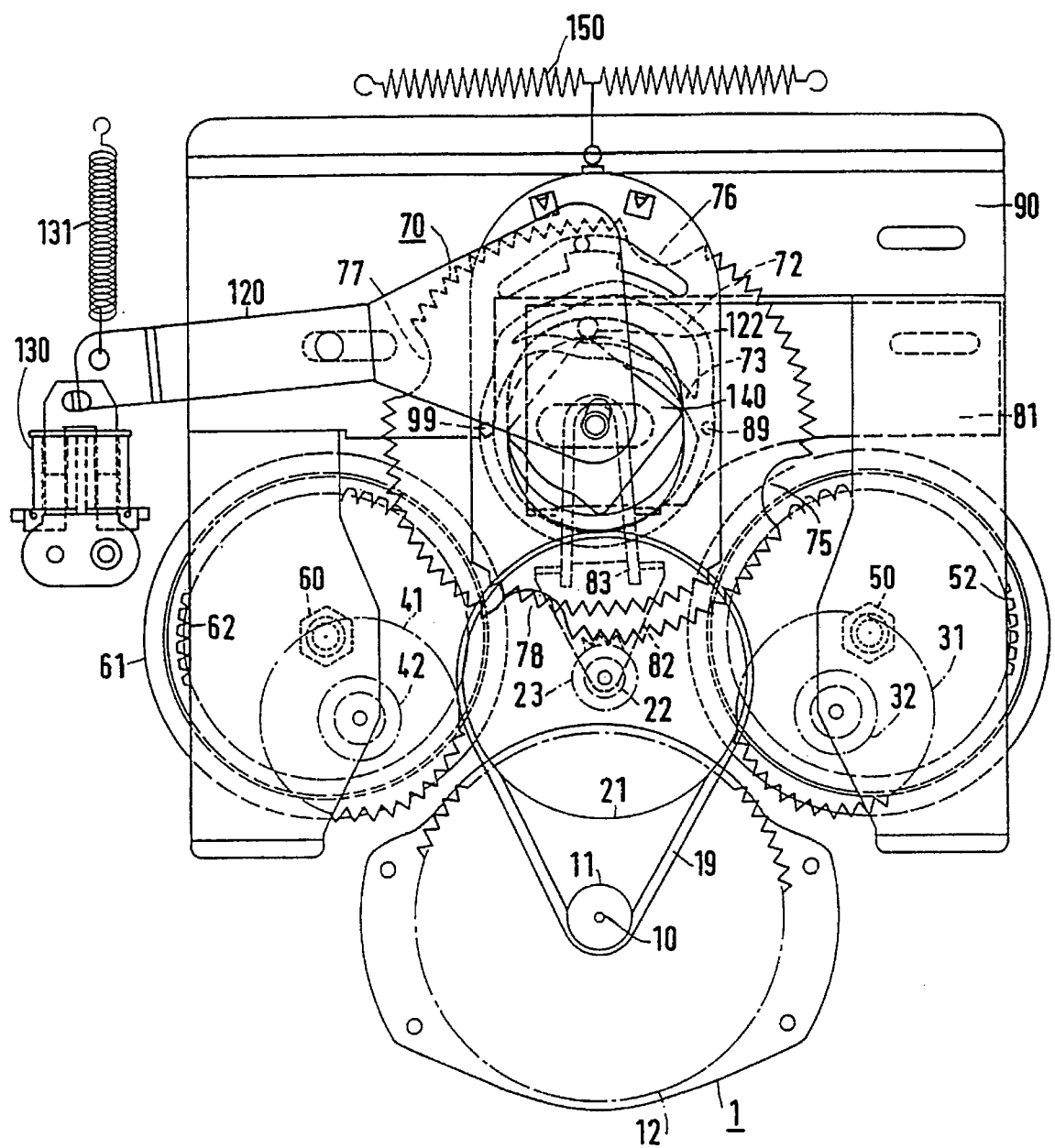
FIG. 9 is a view similar to that in FIG. 3 and in which the cam disc drive wheel is in engagement with the cam disc and the positioning mechanism has resumed its original position, FIG. 10 diagrammatically represents the different modes of the drive arrangement and the switching relationships between them.

FIG. 9 shows an underneath view of the drive arrangement, the quadrangular cam 140, which is non-rotatably coupled to the cam disc 70, having returned the lever 120 into its initial position via the second cam follower 122 coupled to the lever 120. As a result of this movement the slide 110 is again rotationally uncoupled from the cam disc 70 and is reset to its original orientation by a centring spring 150. Since the cam disc drive wheel 23 is now in mesh with the teeth of the cam disc 79 the cam disc 70 will rotate until the cam disc drive wheel 23 is disposed opposite the recess 75, as is shown in FIG. 3.

The first switching mechanism 81, 82, 83 and the second switching mechanism 90 are constructed in such a manner that they have substantially the same stroke, which enables them to cooperate with the same guide surfaces 71. The cam disc 70 has a plurality of guide surfaces 71, which in the present case include the first guide surface 72 and the second guide surface 73, which can guide a cam follower, in the present case both the first cam follower 89 and the second cam follower 99, during rotation of the cam disc 70. The angles which the guide surfaces make with the tangent to the cam disc are so small that the cam disc 70 cooperates with the first switching mechanism 81, 82, 83 and the second switching mechanism 90 both during counterclockwise and clockwise rotation.

When the cam disc 70 is rotated from a given angular position, as shown in FIG. 9, while the motor shaft 10 is driven in the positive direction of rotation 15 the first cam follower 89 will engage the first guide surface 72. By means of the first cam follower 89 this guide surface 72 sets the first switching mechanism 81, 82, 83 to a position in which the first transmission device 11, 19, 21, 22, 51 is in the active state. Since the cam disc drive wheel 23 is moved during this rotation of the cam disc 70 the cam disc 70 has rotated less than a quarter turn before the cam disc drive wheel 23 is situated opposite the recess 75, as shown in FIG. 3. As the cam disc 70 is rotated further in the same direction the first cam follower 89 will reach its initial position, in the present case guided by the first guide surface 72 and a guide surface 72a parallel thereto. When a resilient element which urges the first switching mechanism to its centre position is provided only the first guide surface 72 will be needed.

When the cam disc 70 is rotated from an angular position in which it has been rotated through approximately through 180 degrees relative to the given angular position while the motor shaft 10 is driven in the positive direction of rotation 15 the second cam follower 99 will engage the first guide surface 72. By means of the second cam follower 99 this guide surface 72 sets the second switching mechanism 90 into a position in which the third transmission device 12, 31, 32, 52 is in the active state. Since the cam disc drive wheel 23 is not moved during this rotation of the cam disc 70 the cam disc 70 is rotated a quarter turn before the cam disc drive wheel 23 is situated opposite the recess 77, as shown in FIG. 3. As the cam disc 70 is rotated further in the same direction the second cam follower 99 will reach its initial position, in the present case guided by the first guide surface 72 and the guide surface 72a parallel thereto. When a resilient element which urges the first switching mechanism to its centre position is provided only the first guide surface 72 will be needed.

In a similar manner, the first and the second cam follower 89 and 99, respectively, will engage a second guide surface 73 in the negative direction of rotation 16 of the motor shaft 10, the second guide surface 73 setting the first or the second switching mechanism 81, 82, 83, 90 into a position in which the second transmission device 11, 19, 21, 22, 61 and the fourth transmission device 12, 41, 42, 62, respectively, is in the active state. As the cam disc 70 is rotated further in the same direction the cam followers 89 and 99 will reach their initial positions, in the present case guided by the second guide surface 73 and a guide surface 73a parallel thereto. When resilient elements which urge the first and the second switching mechanism to their centre positions are provided only the second guide surface 73 will be needed.

In an active position of the first transmission device 11, 19, 21, 22, 51 or the second transmission device 11, 19, 21, 22, 62 the angular position of the cam disc 70 and hence the position of the first cam follower 89 relative to the guide surfaces 71 differ from those in an active position of the third transmission device 12, 31, 32, 52 or the fourth transmission device 12, 41, 42, 62. This provides additional design freedom.

By making the strokes of the cam followers 89 and 99 substantially the same the first switching mechanism 81, 82, 83 and the second switching mechanism 90 can be operated by means of one set of guide surfaces 71. This has the advantage that less space is needed than in the case of a construction in which each cam follower 89, 90 has a separate set of guide surfaces 71.

It will be apparent from the above description that the states of the first, second, third and fourth transmission devices 11, 19, 21, 22, 51, 11, 19, 21, 22, 61, 12, 31, 32, 52, 12, 41, 42, 62 are determined exclusively by the cam disc 70. Therefore, all the movable drive wheels of these transmission devices 11, 19, 21, 22, 51, 11, 19, 21, 22, 61, 12, 31, 32, 52, 12, 41, 42, 62 should be actuated by the cam disc, so that no fiction clutches are needed to drive the tape 6. Since gear wheels in these fiction clutches always dissipate more energy than normally journalled gear wheels this step results in a reduction of the energy consumption in comparison with the known apparatus.

Since the cam disc 70 is of such a construction that it can cooperate with the first switching mechanism 81, 82, 83 and the second switching mechanism 90 both during clockwise and counterclockwise rotation the cam disc 70 can be driven by the motor 1 which also provides the tape transport and can be switched rapidly, without any additional parts being required. If the cam disc 70 can cooperate with the switching mechanisms 81, 82, 83 and 90 in only one direction of rotation either only one direction of rotation 15 or 16 of the motor shaft 10 should be employed, which requires additional parts in order to obtain the correct direction of rotation of the spindle wheels 50 and 60, or in specific situations the direction of rotation of the motor shaft 10 should be changed before the it is allowed to drive the cam disc 70, so that the mechanism requires more time to respond to a user command. In the last-mentioned case the instantaneously driven drive spindle 50 or 60 will temporarily rotate in the wrong direction, as result of which the tape 6 is unwound from one of the reel hubs 7 or 8. This may give rise to uncontrolled loops in the tape 6, as a result of which the tape 6 is susceptible to damage.

It will be evident from the above description that owing to the profiles of the guide surfaces 71 the states of the first, second, third and fourth transmission devices 11, 19, 21, 22, 51, 11, 19, 21, 22, 61, 12, 31, 32, 52, 12, 41, 42, 62 are determined by the current stop position of the cam disc and by the direction in which the cam disc 70 has been rotated to reach the current stop position from a stop position preceding the current stop position. As a consequence, one stop position of the cam disc may correspond to two different states of the transmission devices 11, 21, 22, 51, 11, 19, 21, 22, 61, 12, 31, 32, 52, 12, 41, 42, 62. As a result, a smaller number of stop positions are required, so that a larger segment of the cam disc 70 is available to set the drive wheels 21, 22, 31, 32, 41, 42 from one position to the other position via the first or the second mechanism 81, 82, 83 or 90. Consequently, it is possible to obtain an adequate stroke with a cam disc 70 of limited size.

Owing to the profiles of the guide surfaces 71 the sequence of the modes reached by repeatedly energising the electromagnet 130 depends merely on the direction of rotation of the motor shaft. The modes are as follows:

FWD 161 in which the first drive spindle 50 is coupled to the motor shaft 10 in order to be driven with a first transmission ratio, RVS 162 in which the second drive spindle 60 is coupled to the motor shaft 10 in order to be driven with a first transmission ratio, FF 163 in which the first drive spindle 50 is coupled to the motor shaft 10 in order to be driven with a second transmission ratio, REW 164 in which the second drive spindle 60 is coupled to the motor shaft 10 in order to be driven with a second transmission ratio, STOP 160 in which neither drive spindle 50, 60 is coupled to the motor shaft 10 in such a manner that it can be driven.

Figure 10:
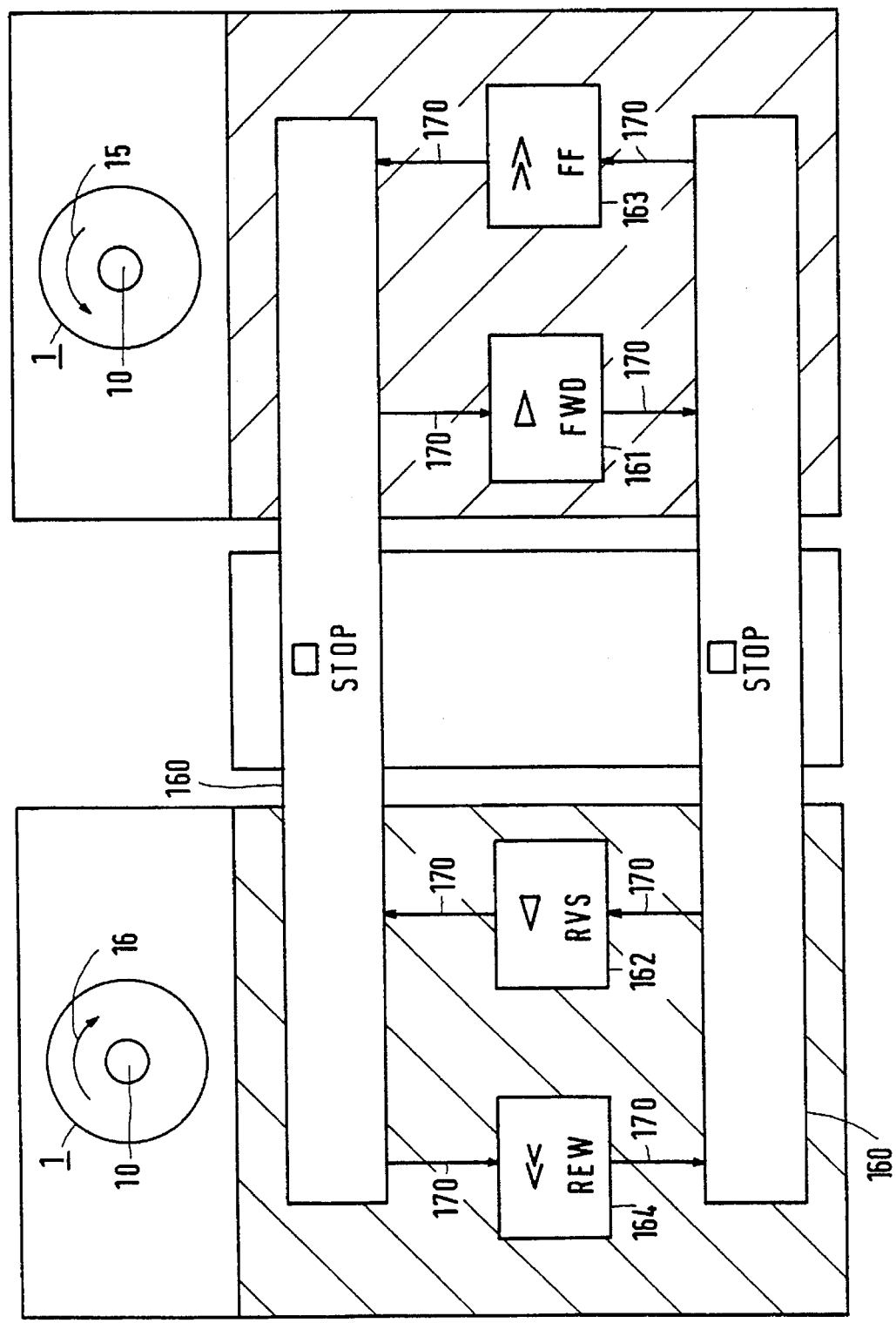

FIG. 10 shows diagrammatically the sequence of the modes upon actuations 170 of the electromagnet 130 in the positive direction of rotation 15 and the negative direction of rotation 16 of the motor shaft 10. This sequence has the advantage that slow and fast winding in one specific direction can be effected successively without a reversal of the direction of rotation of the motor shaft 10 being required. This enables a given piece of information on the tape 6 to be located rapidly. In addition, other mode sequences can be used, if desired, by reversing the direction of rotation of the motor shaft 10 in an active mode and immediately energising the electromagnet.

Figure 11:
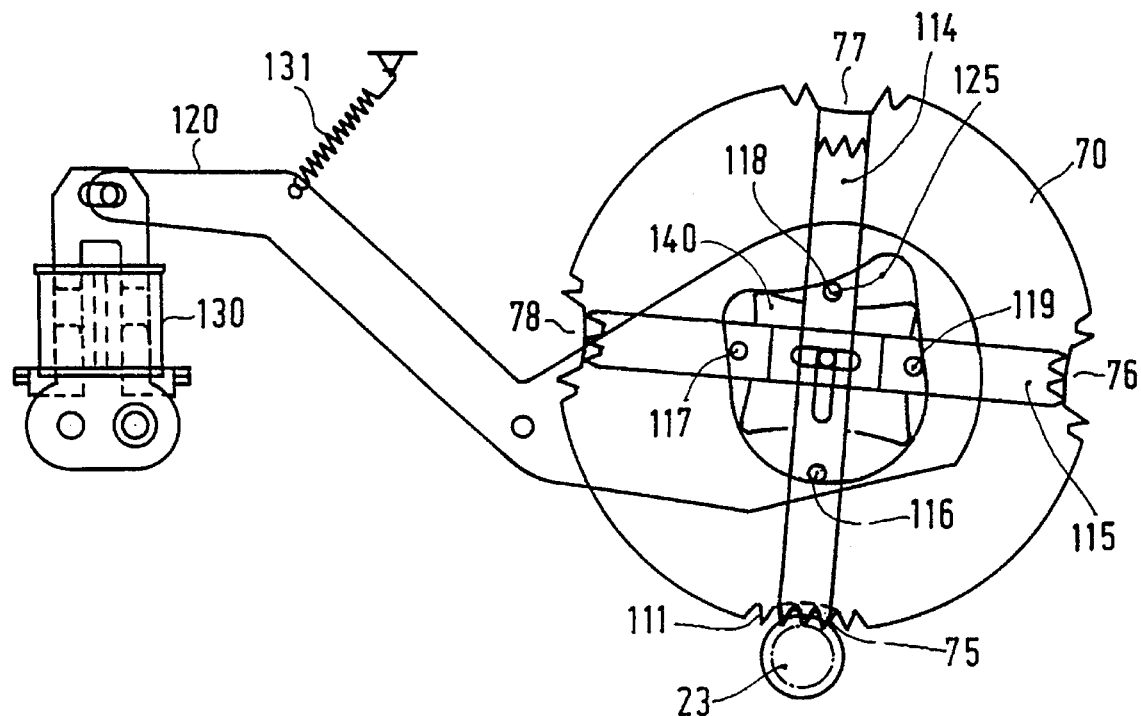
FIG. 11 is a plan view of an alternative positioning mechanism.

FIG. 11 is an underneath view of an alternative construction of the positioning mechanism 120, 130, 114, 115, which comprises a first slide 114 provided with a first pin 116, a second pin 118 and toothed portions 111 and a second slide 115 provided with a third pin 117, a fourth pin 119 and toothed portions 111, a lever 120 having a shield-shaped opening 125 in which the first, the second, the third and the fourth pin 116, 117, 118, 119 are disposed, which lever 120 has its other end coupled to the electromagnet 130 and the helical spring 131. The first and the second slide 114 and 115 are both permanently coupled for rotation to the cam disc 70. If the electromagnet 130 is energised the spiral spring 131 can move the lever 120 in such a manner that the first slide 114, via the third pin 118, assumes a position in which a toothed portion 111 fills the first recess 75. As a result, the cam disc 70 can be driven by the cam disc drive wheel 23 and a situation similar to that described for the preceding construction of the positioning mechanism will arise. The lever is also reset in a manner similar to that in the preceding construction.

Figure 12:
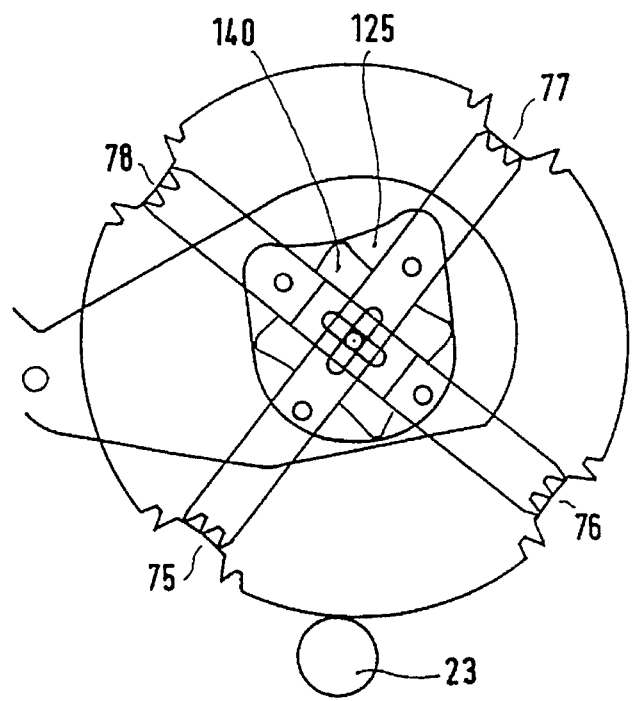
FIG. 12 is a plan view of a part of the alternative positioning mechanism shown in FIG. 11.

FIG. 12 shows a part of the positioning mechanism 110, 120, 130, 131; 114, 115, the lever 120 being urged into its initial position by the quadrangular cam 140 situated inside the shield-shaped opening 125 and being non-rotatably coupled to the cam disc 70. Since the cam disc drive wheel 23 is now in mesh with the teeth of the cam disc 79 the cam disc 70 will continue rotating until the cam disc drive wheel 23 is disposed opposite the next recess 76. In comparison with the preceding construction this last-mentioned construction of the positioning mechanism 110, 120, 130, 131; 114, 115 has the advantage that a more accurate synchronisation of the teeth of the slides 114 and 115 and the teeth of the cam disc 79 is possible and that the coupling of the slides 115 and 115 to the cam disc 70 is simpler. Moreover, no spring is needed to reset the slides 114 and 115 to their original positions.

The invention is based on the recognition of the fact that in any mode of the apparatus a minimal number of drive wheels should rotate and that the friction of these drive wheels should be minimised in order to realise an energy-effective apparatus. The invention has been described applied to an apparatus using a cassette. However, the invention can also relate to apparatuses using other types of web-like information carders, such as for example optical tape.

We claim:

1. An apparatus comprising a drive arrangement for winding an information carrier in the form of a tape between a first reel hub and a second reel hub and vice versa, which apparatus comprises a motor having a motor shaft drivable in a positive direction of rotation and an opposite negative direction of rotation a first drive spindle for driving the first reel hub and including a first spindle wheel, a second drive spindle for driving the second reel hub and including a second spindle wheel, a first, a second, a third and a fourth transmission device, respectively, comprising a first, a second, a third and a fourth set of drive wheels, each set of drive wheels including one of the spindle wheels and being directly drivable by said motor, which transmission devices are switchable between inactive and active states and respectively serve for the motor shaft to drive the first drive spindle with a first transmission ratio,
the second drive spindle with a first transmission ratio,
the first drive spindle with a second transmission ratio, and
the second drive spindle with a second transmission ratio, switching mechanisms for switching the first, the second, the third and the fourth transmission device between active and inactive states, a rotatable cam disc having guide surfaces which cooperate with at least one switching mechanism, and a cam disc drive wheel for driving the cam disc, the cam disc being rotatable to a plurality of stop positions each corresponding to one of the states of one of the transmission devices while at the same time the other transmission devices are in their inactive states, characterised in that:

said states of the first, the second, the third and the fourth transmission device are determined exclusively by the cam disc, and the cam disc is rotatable both in a clockwise direction of rotation and in an opposite counterclockwise direction of rotation and cooperates with the switching mechanisms in each of the directions of rotation of the cam disc.

2. An apparatus as claimed in claim 1, characterised in that a number of states of the first, the second, the third and the fourth transmission device are determined by the stop position of the cam disc and by the direction of rotation in which the cam disc has been rotated to reach the stop position from a previous stop position.

3. An apparatus as claimed in claim 2, characterised in that:

said cam disc includes first, second, third and fourth guide surfaces;

the apparatus comprises a first switching mechanism for switching the first transmission device and the second transmission device between active and inactive states, and the first switching mechanism comprises a first cam follower which cooperates with said guide surfaces of the cam disc the apparatus comprises a second switching mechanism for switching the third transmission device and the fourth transmission device between active and inactive states, and the second switching mechanism comprises a second cam follower which cooperates with said guide surfaces of the cam disc, when the cam disc is rotated from a given angular position while the motor shaft rotates in the positive direction of rotation the first cam follower engages said first guide surface and sets the first switching mechanism to a position in which the first transmission device is in the active state and when the cam disc is rotated further in the same direction the first cam follower returns to its initial position, when the cam disc is rotated from a given angular position in which it has been rotated through 180 degrees relative to said given angular position while the motor shaft rotates in the negative direction of rotation the first cam follower engages said second guide surface and sets the first switching mechanism to a position in which the second transmission device is in the active state and when the cam disc is rotated further in the same direction the first cam follower returns to its initial position, when the cam disc is rotated from a given angular position in which it has been rotated through 180 degrees relative to said given angular position while the motor shaft rotates in the positive direction of rotation the second cam follower engages said third guide surface and sets the second switching mechanism to a position in which the third transmission device is in the active state and when the cam disc is rotated further in the same direction the second cam follower returns to its initial position, when the cam disc is rotated from said given angular position while the motor shaft rotates in the negative direction of rotation the second cam follower engages said fourth guide surface and sets the second switching mechanism to a position in which the fourth transmission device is in the active state and when the cam disc is rotated further in the same direction the second cam follower returns to its initial position.

4. An apparatus as claimed in claim 3, characterised in that the first switching mechanism and the second switching mechanism are each moveable to:

one extreme position in which the first transmission device or the third transmission device, respectively, is in the active state, one extreme position in which the second transmission device or the fourth transmission device, respectively, is in the active state, and one centre position in which the first transmission device and the second transmission device, or the third transmission device and the fourth transmission device, respectively, are in an inactive state.

5. An apparatus as claimed in claim 4, characterised in that the first cam follower and the second cam follower each have a respective stroke to switch between an active and an inactive state of a transmission device, said strokes being substantially the same, and the first switching mechanism and the second switching mechanism cooperate with the same guide surfaces of the cam disc.

6. An apparatus as claimed in claim 5, characterised in that a said transmission device includes an elastic belt and two drive pulleys rotatable about respective axes of rotation and mutually coupled in a driving relationship via said elastic belt, and the axes of rotation of the pulleys are disposed closer to one another in the inactive state than in the active state of the transmission device which includes said drive pulleys.

7. An apparatus as claimed in claim 6, characterised in that the drive spindles and the cam disc drive wheel are both drivable by said motor.

8. An apparatus as claimed in claim 7, characterised in that a first drive wheel of one of (i) the first set of drive wheels and (ii) the second set of drive wheels is drivable by the motor in all the stop positions of the cam disc, a spindle supports both the cam disc drive wheel and said first drive wheel, and the cam disc drive wheel is non-rotatably coupled to said first drive wheel.

9. An apparatus as claimed in claim 8, characterised in that the cam disc has a plurality of circumferential recesses each disposed opposite the cam disc drive wheel in one of the stop positions of the cam disc and the cam disc drive wheel is freely rotatable in one of said recesses in said stop positions, the apparatus comprises a positioning mechanism for temporarily realising a driving cooperation between the cam disc and the cam disc drive wheel when the cam disc is in a stop position in which a circumferential recess is disposed opposite the cam disc drive wheel, and the positioning mechanism comprises:

a slide movable between retracted and slid-out positions and comprising a driving portion at a free end, a sliding mechanism for cooperating with the slides, and a disengageable latch adapted to cooperate with the sliding mechanism, and by disengagement of the latch the sliding mechanism can move a said slide to a slid-out position in which the driving portion is in contact with the cam disc drive wheel and said slide is non-rotatably coupled to the cam disc and the cam disc drive wheel is in a driving relationship with the cam disc.

10. An apparatus as claimed in claim 3, characterised in that the first cam follower and the second cam follower each have a respective stroke to switch between an active and an inactive state of a transmission device, said strokes being substantially the same, and the first switching mechanism and the second switching mechanism cooperate with the same guide surfaces of the cam disc.

11. An apparatus as claimed in claim 2, characterised in that said switching mechanisms include a first switching mechanism and a second switching mechanism, the first switching mechanism and the second switching mechanism each being moveable to:

one extreme position in which the first transmission device or the third transmission device, respectively, is in the active state, one extreme position in which the second transmission device or the fourth transmission device, respectively, is in the active state, and one centre position in which the first transmission device and the second transmission device, or the third transmission device and the fourth transmission device, respectively, are in an inactive state.

12. An apparatus as claimed in claim 11, characterised in that: the first and second switching mechanisms each include a respective cam follower which cooperate with said guide surfaces on said cam disc; and the first cam follower and the second cam follower each have a respective stroke to switch between an active and an inactive state of a said transmission device, said strokes being substantially the same, and the first switching mechanism and the second switching mechanism cooperate with the same guide surfaces of the cam disc.

13. An apparatus as claimed in claim 12, characterised in that a said transmission device includes an elastic belt and two drive pulleys rotatable about respective axes of rotation and mutually coupled in a driving relationship via said elastic belt, and the axes of rotation of the pulleys are disposed closer to one another in the inactive state than in the active state of the transmission device which includes said drive pulleys.

14. An apparatus as claimed in claim 13, characterised in that the drive spindles and the cam disc wheel are drivable by said motor.

15. An apparatus as claimed in claim 14, characterised in that a first drive wheel of one of (i) the first set of drive wheels and (ii) the second set of drive wheels is drivable by the motor in all the stop positions of the cam disc, a spindle supports both the cam disc drive wheel and said first drive wheel, and the cam disc drive wheel is non-rotatably coupled to said first drive wheel.

16. An apparatus as claimed in claim 15, characterised in that the cam disc has a plurality of circumferential recesses each disposed opposite the cam disc drive wheel in one of the stop positions of the cam disc and the cam disc drive wheel is freely rotatable in one of said recesses in said stop positions, the apparatus comprises a positioning mechanism for temporarily realising a driving cooperation between the cam disc and the cam disc drive wheel when the cam disc is in a stop position in which a circumferential recess is disposed opposite the cam disc drive wheel, and the positioning mechanism comprises:

a slide which is movable between retracted and slid-out positions and comprises a driving portion at a free end, a sliding mechanism for cooperating with the slides, and a disengageable latch adapted to cooperate with the sliding mechanism, and by disengagement of the latch the sliding mechanism can move a slide to a slid-out position in which the driving portion is in contact with the cam disc drive wheel and the slide is non-rotatably coupled to the cam disc and the cam disc drive wheel is in a driving relationship with the cam disc.

17. An apparatus as claimed in claim 1, characterised in that a said transmission device includes an elastic belt and two drive pulleys rotatable about respective axes of rotation and mutually coupled in a driving relationship via said elastic belt, and the axes of rotation of the pulleys are disposed closer to one another in the inactive state than in the active state of the transmission device which includes said drive pulleys.

18. An apparatus as claimed in claim 1, characterised in that the drive spindles and the cam disc wheel are drivable by said motor.

19. An apparatus as claimed in claim 18, characterised in that a first drive wheel of one of (i) the first set of drive wheels and (ii) the second set of drive wheels is drivable by the motor in all the stop positions of the cam disc, a spindle supports both the cam disc drive wheel and said first drive wheel, and the cam disc drive wheel is non-rotatably coupled to said first drive wheel.

20. An apparatus as claimed in claim 1, characterised in that the cam disc has a plurality of circumferential recesses each disposed opposite the cam disc drive wheel in one of the stop positions of the cam disc and the cam disc drive wheel is freely rotatable in one of said recesses in said stop positions, the apparatus comprises a positioning mechanism for temporarily realising a driving cooperation between the cam disc and the cam disc drive wheel when the cam disc is in a stop position in which a circumferential recess is disposed opposite the cam disc drive wheel, and the positioning mechanism comprises:

a slide which is movable between retracted and slid-out positions and comprises a driving portion at a free end, a sliding mechanism for cooperating with the slides, and a disengageable latch adapted to cooperate with the sliding mechanism, and by disengagement of the latch the sliding mechanism can move a slide to a slid-out position in which the driving portion is in contact with the cam disc drive wheel and the slide is non-rotatably coupled to the cam disc and the cam disc drive wheel is in a driving relationship with the cam disc.

\* \* \* \* \*